Sept. 27, 1966            L. J. NIESE           3,275,135
CHECKWEIGHING AND ASSORTING SYSTEM HAVING
A TILTABLE CONVEYOR BELT Filed Dec. 23, 1963                               2 Sheets-Sheet 1

INVENTOR.
LEO J. NIESE
BY Marshall, Wilson & Yeasting
—attorneys—

Sept. 27, 1966 L. J. NIESE 3,275,135
CHECKWEIGHING AND ASSORTING SYSTEM HAVING
A TILTABLE CONVEYOR BELT
Filed Dec. 23, 1963 2 Sheets-Sheet 2
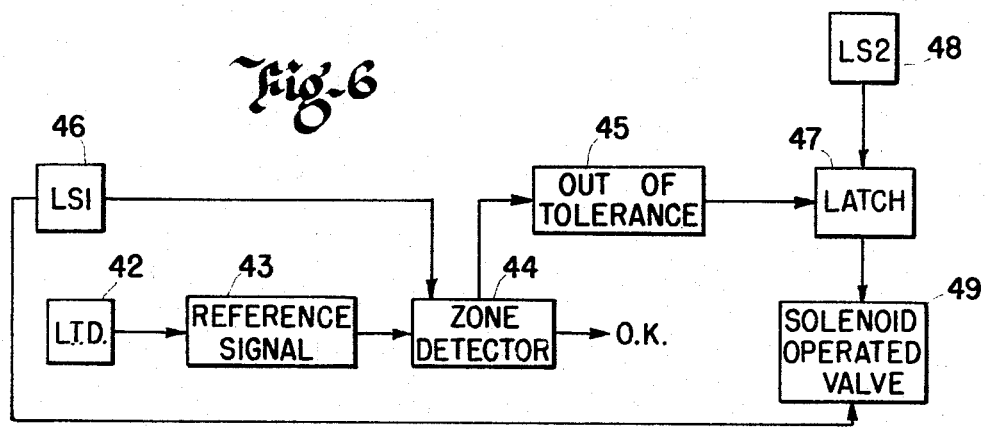
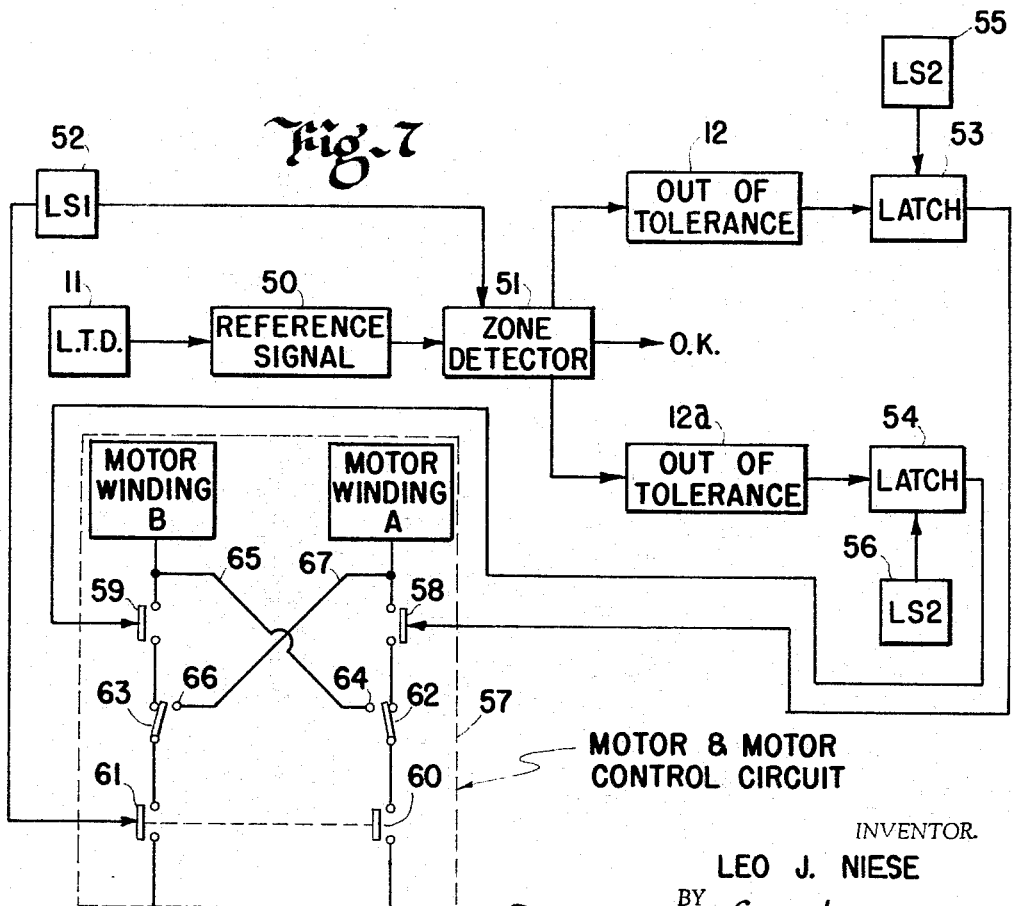
INVENTOR.
LEO J. NIESE
BY Marshall, Wilson & Yeasting
—attorneys—

United States Patent Office 3,275,135
Patented Sept. 27, 1966

3,275,135
CHECKWEIGHING AND ASSORTING SYSTEM HAVING A TILTABLE CONVEYOR BELT
Leo J. Niese, Toledo, Ohio, assignor to Toledo Scale Corporation, Toledo, Ohio, a corporation of Ohio
Filed Dec. 23, 1963, Ser. No. 332,515
16 Claims. (Cl. 209—74)

This invention relates to segregation mechanism and more particularly to mechanism which segregates bags of merchandise or similar articles into a plurality of groups dependent upon some particular property, such as the weight, of the bags.

An object of the present invention is to provide a segregation system for bag products.

Another object is to provide a segregation system for relatively heavy articles.

Still another object is to provide a segregation system which is of low cost yet which is capable of running for extended periods of time without breakdowns.

A further object is to improve check-weighing systems.

Another object is to increase the precision of check-weighing systems.

Still another object is to simplify check-weighing systems.

A further object is to so interlock segregation mechanism and a weighing scale in a check-weighing system that the segregation mechanism is inoperative until the article to be segregated leaves the weighing scale and the segregation mechanism, after moving to segregate the article, will not return into position to accept the next article until it has fully operated to segregate the first article.

Another object is to so synchronize segregation mechanism and a weighing scale in a check-weighing system that high speed, continuous check-weighing of relatively heavy articles is accomplished.

A further object is to provide automatic segregation for relatively heavy articles.

One embodiment of this invention enabling the realization of these objects is a combination of a conveyor belt check-weighing scale and conveyor belt segregation mechanism. Both conveyor belts are of the same length, run continuously at the same speed in the same direction, and are arranged with the discharge end of the weighing scale belt juxtaposed to the loading end of the segregation belt, the upper belt flights normally being in the same horizontal plane. The segregation belt is Teflon coated (low friction) and is mounted to tilt along with its motor-drive either to the right or left (or both) at a right angle to the main stream flow. Filled bags of paper, burlap and cloth are easily handled. Signals from the check-weighing scale control the segregation mechanism which does not tilt when articles of correct weight are check-weighed but which tilts to reject articles of over or under weight. Diversion of heavy filled bags, e.g., 150 pounds, in one embodiment is either to the right or left as desired, both over-weight and under-weight bags being diverted in the same direction. In a modification, diversion of such bags is in two directions, over-weight bags being diverted in one direction and under-weight bags being diverted in the other direction. More classes can be had by tilting through a first increment to provide a first zone, tilting through a second increment to provide a second zone, etc. Also, the operation can be reversed so that the segregation mechanism does not tilt when articles of unacceptable weight are check-weighed and which tilts when articles of correct weight are check-weighed.

The system is completely automatic and is so interlocked electrically that the segregation mechanism is inoperative until the bag to be segregated leaves the weighing scale. After tilting to segregate the bag, the segregation mechanism cannot return to its normal untilted position until it has tilted fully to segregate the first article.

In accordance with the above, one feature of this invention resides in tilting the segregation belt together as one with its motor-drive. This provides a simple design and facilitates a rugged construction which is easily able to handle heavy bags, such as 150 pound bags.

Another feature resides in so synchronizing the segregation system and the weighing scale that high speed, continuous and automatic check-weighing of relatively heavy bags can be accomplished.

Still another feature resides in the versatility provided in the ability to tilt either to the right or left of the main stream flow to divert both over-weight and under-weight bags in the same direction, and to tilt in two directions to divert over-weight bags in one direction and under-weight bags in the other direction. This permits the tailoring of the segregation mechanism for the varying demands of various installations.

The above and other objects and features of this invention will be appreciated more fully from the following detailed description when read with reference to the accompanying drawings wherein:

FIG. 6 is a block diagram of a control circuit for the segregation mechanism shown in FIG. 5; and FIG. 7 is a block diagram of a control circuit for the segregation mechanism shown in FIGS. 1–4.

Figure 1:
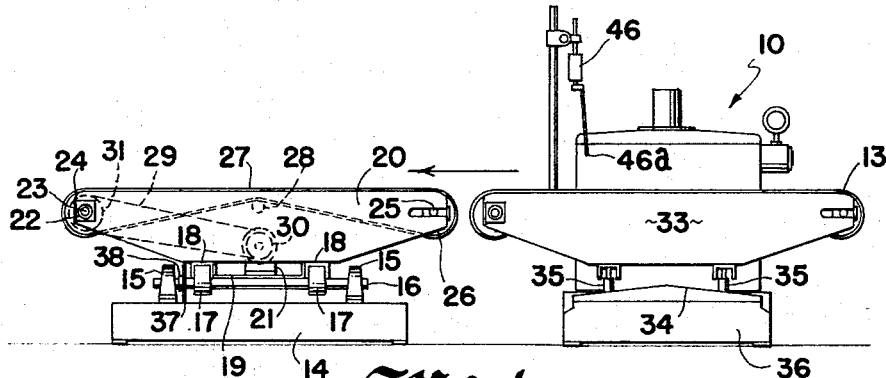
FIG. 1 is a side elevational view of the segregation mechanism according to this invention combined with a weighing scale in a check-weighing system.

Referring to the drawings, in FIG. 1 segregation mechanism as contemplated in this invention is shown in combination with a weighing scale or automatic check-weigher 10 which is adapted to actuate a linear differential transformer 11 (FIG. 7) when an object of over or under weight passes over the weighing scale (objects of correct weight do not actuate the linear differential transformer 11). The transducer 11, i.e., the linear differential transformer 11, in combination with the control circuit shown in FIG. 7, closes a first contact in an out of tolerance circuit 12 when an article passing over the scale is over-weight and closes a second contact in an out of tolerance circuit 12a when an article is under-weight. Neither contact is closed when the article is of the correct weight. The exact weighing mechanism forms no part of the present invention and is thus not described in detail. Suffice it to say that the checkweigher 10 includes a continuously-driven endless belt 13 which serves both to convey the articles and as a platform for the checkweigher.

For the sake of simplicity, the checkweigher 10 may be pictured as being adapted to actuate a double throw switch when an object passes over the weighing device (see double throw switch 10 in a checkweigher in U.S. Patent No. 3,093,245 issued June 11, 1963, in the names of L. E. Worcester and R. L. Underwood). The double throw switch shown in the patent closes a first circuit when an article passing over the scale is over-weight and closes a second circuit when an article is under-weight. Neither circuit is closed when the article is of the correct weight. The closing or non-closing of such circuit controls a pair of solenoids which operates segregation mechanism in accordance with the weighing scale signals. Similarly, the segregation mechanism as contemplate in this invention is controlled by the closing or non-closing of contacts in accordance with weighing scale signals.

Figure 2:
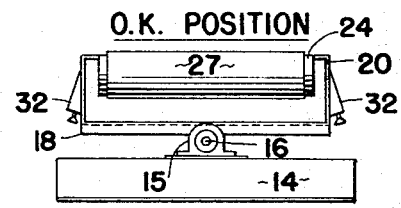
FIG. 2 is a fragmentary, end elevational view of the segregation mechanism shown in FIG. 1 showing such mechanism in its normal, untilted position.

The segregation mechanism proper includes a base 14 which carries a pair of bearing blocks 15 that journal a rotatable shaft 16. A pair of blocks 17 is attached to the shaft 16 for movement together as one with the shaft and each of the blocks 17 carries an inverted channel 18 which extends the full width of the segregation mechanism, as shown in FIG. 2. An upright channel 19, at a right angle to the channels 18, is supported on the shaft 16 between the channels 18, as shown in FIG. 1. The inverted channels 18 function as a support for an inverted, flat-bottomed, U-shaped frame 20 and the upright channel 19 functions as a support for a motor 21.

Each of the legs of the U-shaped frame 20 carries a bearing block 22, one of which is shown in FIG. 1, which journal a shaft 23 that carries a roller 24 which turns with the shaft 23. The legs of the U-shaped frame 20 also carry a stationary shaft 25, remotely located relative to the rotatable shaft 23, which functions to rotatably mount a roller 26. An endless conveyor belt 27 runs around the rollers 24 and 26 and over an idler 28, carried between the legs of the U-shaped frame 20, the idler serving to hold the belt 27 clear of the motor 21. The motor 21 is operatively connected to the rotatable shaft 23 through a timing belt 29 which runs around pulleys 30 and 31 on the shaft of the motor 21 and shaft 23, respectively. When the check-weighing system is in operation, the motor 21 drives the endless conveyor belt 27 continuously through the above drive. The endless belt 27 is Teflon coated, having a low coefficient of friction so that the articles to be segregated slide off the belt 27 readily when it is tilted. Filled bags of paper, burlap and cloth are easily handled. The conveyor belt 27 is tiltable along with its motor-drive through an angle of about twenty degrees about the axis of the shaft 16 when the shaft 16 is rotated. Such tilt is limited in both directions by stops 32 which engage the top of the base 14, the stops 32 being shown in FIGS. 2-4 but not in FIG. 1 for clarity of illustration, and such tilt is at a right angle to the main stream flow indicated by the arrow in FIG. 1.

As noted above, the exact weighing mechanism forms no part of the present invention and is therefore not described in detail. The checkweigher 10 includes the endless conveyor belt 13 which is mounted and carried on a frame 33 in exactly the same manner as is the endless conveyor belt 27, the frames 20 and 33, as shown in FIG. 1, being duplicates. The checkweigher belt 13 is motor-driven in the same manner as is the segregating belt 27. The frame 33 is carried above a dead cover 34 on studs 35 which are carried in turn by conventional lever mechanism, not shown, contained within a weighing scale base 36. Movements of the lever mechanism are transmitted to the transducer 11 (FIG. 7).

The conveyor belt check-weighing scale 10 and the conveyor belt segregation mechanism are combined as shown in FIG. 1. Both conveyor belts 13 and 27 are of the same length, run continuously at the same speed (to synchronize the system) in the same direction, and are arranged with the discharge end of the weighing scale belt 13 juxtaposed to the loading end of the segregation belt 27, the upper belt flights normally being in the same horizontal plane, as shown in FIG. 1. The segregation belt 27 is tilted or is not tilted in accordance with weighing scale signals, the tilting being accomplished by means including a chain 37 which runs around a sprocket 38 on the shaft 16.

Figures 3, 4:
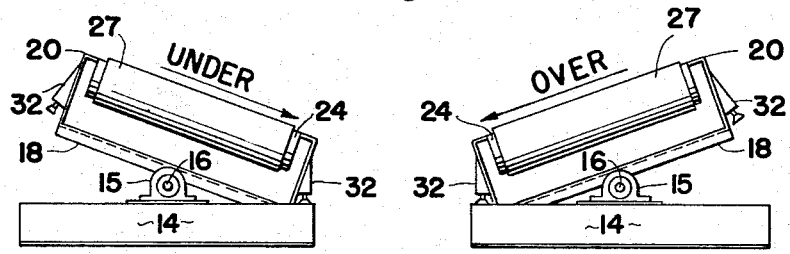
FIG. 3 is a view corresponding to FIG. 2 showing the segregation mechanism tilted to the right.
FIG. 4 is a view corresponding to FIG. 2 showing the segregation mechanism tilted to the left.

The segregation mechanism shown in FIGS. 1–4 diverts heavy filled bags, e.g., 150 pounds, in two directions, under-weight bags being diverted to the right as shown in FIG. 3 and over-weight bags being diverted to the left as shown in FIG. 4. In a modification, shown in FIG. 5, diversion of the bags is to the right, both over-weight and under-weight bags being diverted in the same direction. However, diversion of the bags can be to the left if desired. Reference numbers in FIG. 5 which are similar to those in FIGS. 1–4 refer to parts which are alike in structure and in function. The segregation belts 27a is tilted by means including a pneumatic cylinder 39 which is pivoted at 40 to the base 14a and which has its piston rod pivoted at 41 to one of the channels 18a. The segregation belt 27a and its adjuncts are symmetrical on either side of the axis of the shaft 16a. This balanced structure normally is held horizontal by the pneumatic cylinder's piston rod which bottoms in the cylinder 39.

The segregation mechanism shown in FIGS. 1–4 provides three weight classes, i.e., "O.K.," "UNDER" and "OVER." More classes can be had by tilting through a first increment to provide a first zone, tilting through a second increment to provide a second zone, etc. Also, in such segregation mechanism and in the modification shown in FIG. 5, the operation can be reversed so that the segregation mechanism does not tilt when "UNDER" and "OVER" bags are detected and tilts when "OK" bags are detected.

The system is completely automatic and is so interlocked electrically that the segregation mechanism is inoperative until the bag to be segregated leaves the checkweight 10. After tilting to segregate the bag, the segregation mechanism cannot return to its normal untilted position until it has tilted fully to segregate the first bag. The system shown in FIGS. 1–4 incorporates the control circuit shown in FIG. 7 (two-way tilt). The modification shown in FIG. 5 incorporates the control circuit shown in FIG. 6 (one-way tilt). The linear differential transformer 11 (FIG. 7) which is described above as being actuated by the automatic checkweigher 10 is shown as the linear differential transformer 42 in FIG. 6, i.e., the same checkweigher 10 together with its transducer is used with either the segregation device shown in FIGS. 1–4 or the segregation device shown in FIG. 5.

With reference to FIG. 6, a linear differential transformer, which is like the linear differential transformer 42, is shown schematically in U.S. application Ser. No. 126,774 filed June 29, 1961, now U.S. Patent No. 3,165,- 926, in the names of R. F. Orr and K. F. Wetzel. The armature of this transformer is connected by mechanical linkage to a load receiving platform. When the armature moves, it effects a magnetic unbalance of the transformer in one sense and produces an A. C. signal output which is amplified. The amplitude of the amplified voltage is proportional to the load upon the weighing scale platform. The amplifier is at null at zero load. Similarly, the linear differential transformer 42 produces no signal when the weight of a bag upon the checkweigher belt 13 is "O.K.". As indicated by the "O.K." arrow in FIG. 6, when no output signal is produced by the transducer 42 nothing happens, i.e., the segregation belt 27a is not tilted and the bag of correct weight is conveyed from one end of the segregation belt 27a to the other. However, the linear differential transformer 42 produces a signal of a plus or minus sense when the weight of a bag upon the checkweigher belt 13 is "OVER" or "UNDER". This signal which is amplified is applied as an input to a reference signal circuit 43. An example of a reference signal circuit to which such an amplified transducer signal is applied is shown schematically in the above U.S. application Ser. No. 126,774 that shows such reference signal circuit operating zone detector relays which close their contacts to classify tested springs into "O.K.", "OVER" and "UNDER" classes. Similar zone detector relays are shown in block form in FIG. 6 as zone detector 44. Accordingly, the zone detector 44 decides which zone by picking the proper relay which have their contacts wired in parallel and located in out of tolerance circuit 45. A normally open limit switch 46 which is controlled by a switch operator 46a (FIG. 1)

that is held closed by a bag on the checkweigher belt 13 (FIG. 1) keeps the energized one of the relays in the zone detector 44 energized as long as the bag is upon the checkweigher belt 13 (ordinary holding or relay sealing circuit).

The linear differential transformer 42, in short, in combination with the reference signal circuit 43 and the zone detector 44, closes a first contact in the out of tolerance circuit 45 when an article passing over the scale is over-weight and closes a second contact in the out of tolerance circuit 45 when an article is under-weight (contacts in parallel). Neither contact is closed when the article is of the correct weight. The contacts in the out of tolerance circuit 45 are in circuit with a latch 47 consisting of two ordinary relay coils which are coupled mechanically. When one of the two latch relays is energized by the closing of one or the other of the contacts in the out of tolerance circuit 45 it is mechanically locked in its energized position by the other one of the two latch relays, which other one of the two latch relays is energized by the closing of a limit switch 48 to unlock the latched relay. The limit switch 48 is located in any convenient position on the base 14a (FIG. 5) in which it is closed by the segregation mechanism in its fully tilted position. Accordingly, the latch 47 is latched by the closing of one or the other of the relay contacts in the out of tolerance circuit 45 and is unlatched by the closing of the limit switch 48.

The block labeled "Solenoid Operated Valve" and identified by the numerau 49 contains two relay contacts in series with the coil of the solenoid. One of such contacts closes when limit switch 46 opens (switch 46 opens when a bag leaves the checkweigher) and the other of such contacts closes when the latch 47 is latched (out of tolerance). Closing of such two contacts energizes the solenoid coil and the solenoid operated valve 49 so admits air to the pneumatic cylinder 39 (FIG. 5) that the cylinder's piston rod drives the checkweigher belt 27a to the tilted position shown in FIG. 5. Limit switch 48 is closed by the tilted mechanism to unlatch the latch 47 causing the latch relay contact in the block 49 to open releasing the solenoid and return the segregation mechanism to normal (checkweigher belt 27a horizontal).

In short, the coil of the solenoid operated valve 49 is energized (to tilt reject mechanism) when one of the out of tolerance contacts in the circuit 45 is closed by the transducer 42 detecting an "OVER" or "UNDER" bag and when the limit switch 46 signals that the bag is enough off of the checkweigher 10 that it can be dumped at a right angle to the main stream flow, and the coil of the solenoid operated valve 49 is deenergized (to return the tilting mechanism to normal) when the limit switch 48 is closed by the fully tilted mechanism.

The control circuit shown in FIG. 6 (one-way tilt) so interlocks the segregation mechanism and the weighing scale 10 that the segregation mechanism is inoperative until the bag leaves or substantially leaves the weighing scale (solenoid operated valve 49 cannot operate until bag-operated limit switch 46 opens). Also, the segregation mechanism must move to its fully tilted position, in order to be sure that the bag is dumped off, before it can be returned to its normal position (solenoid operated valve 48 cannot be released until limit switch 48 closes). These interlocks ensure fool proof operation. Also, the control circuit, in combination with the arrangement of two conveyor belts each having the same length and that are run continously at the same speed, makes possible automatic, high speed, continuous check-weighing (synchronized system).

In operation, bags to be check-weighed are placed upon the right hand end of the checkweigher belt 13 as viewed in FIG. 1. The bags are carried in the main-stream direction, indicated by the arrow, by the belt 13 which serves both to convey the bags and as a platform for the check-weighing scale. The bags hold the limit switch 46 closed until they transfer substantially to the segregation belt 27a. When the limit switch 46 opens, because a bag is leaving the checkweigher, it causes a relay contact in circuit with the coil of the solenoid operated valve 49 to close. This conditions the valve 49 for operation.

Figure 5:
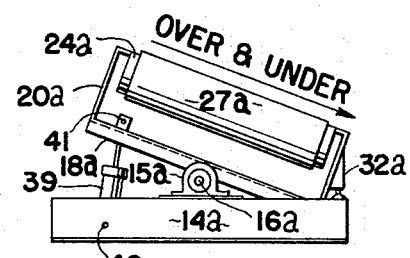
FIG. 5 is a view corresponding to FIG. 3 showing a modification of the segregation mechanism.

A first out-of-tolerance contact in the out of tolerance circuit 45 closes when a bag passing over the scale is over-weight and a second out-of-tolerance contact in the out of tolerance circuit 45 closes when a bag passing over the scale is under-weight. Neither contact is closed when the bag is of the correct weight. Closing of either one of the out of tolerance contacts, causes the conditioned valve 49 (conditioned by limit switch 46 opening) to operate and tilt the reject mechanism as shown in FIG. 5 (one-way tilt). This separates the "OVER" and "UNDER" bags from the main stream flow. Closing of neither out-of-tolerance contact leaves the reject mechanism in its horizontal position and the "O.K." bags are discharged from the discharge end of the nontilted segregation belt 27a.

One feature of the invention resides in tilting the segregation belt 13a together as one with its motor-drive. This allows a simple design and facilitates a rugged construction which is easily able to handle heavy bags, such as 150 pound bags.

The two-way tilt circuit shown in FIG. 7 is similar to the one-way tilt circuit shown in FIG. 6 and described above. The linear differential transformer 11, a reference signal circuit 50, a zone detector 51, and a limit switch 52 correspond in structure and function to the linear differential transformer 42, the reference signal circuit 43, the zone detector 44, and the limit switch 46, respectively. The out of tolerance circuits 12 and 12a (FIG. 7) are like the out of tolerance circuit 45 (FIG. 6), except that, whereas the out of tolerance circuit 45 contains both the over-weight tolerance contact and the underweight tolerance contact wired in parallel, the out of tolerance circuit 12 contains only an over-weight tolerance contact and the out of tolerance circuit 12a contains only an under-weight tolerance contact. The latches 53 and 54 (FIG. 7) each is a duplicate of the latch 47 (FIG. 6). The limit switches 55 and 56 (FIG. 7) each is a duplicate of and is actuated the same as the limit switch 48 (FIG. 6). A motor 57 (FIG. 7) drives the chain 37 (FIG. 1) to accomplish the two-way tilt rejection. The motor 57 has three positions, a center position which holds the segregation belt 27 horizontal as shown in FIG. 2, a second position on one side of such center position which drives the segregation belt 27 to its tilted position shown in FIG. 3, and a third position on the other side of such center position which drives the segregation belt 27 to its tilted position shown in FIG. 4. The motor 57 is heavily geared down to enable it to hold the segregation belt 27 securely in its horizontal position. Stops 32 support the segregation belt 27 in its tilted positions. Energization of the motor windings A or B (FIG. 7) causes the motor 57 to move from its center position into one of its other positions and vice versa.

The latch 53 is latched by the closing of the over-tolerance relay contact in the out of tolerance circuit 12 and is unlatched by the closing of the limit switch 55. Latching of the latch 53 causes the energized latch relay to close its contact 58 in circuit with the motor winding A and unlatching of the latch 53 causes the deenergized latch relay to open such contact 58. The latch 54 is latched by the closing of the under-tolerance relay contact in the out of tolerance circuit 12a and is unlatched by the closing of the limit switch 56. Latching of the latch 54 causes the energized latch relay to close its contact 59 in circuit with the motor winding B and unlatching of the latch 54 causes the deenergized latch relay to open such contact 59. Just as the limit switch 46 (FIG. 6), when it opens as a bag leaves the checkweigher 10, causes a relay contact in circuit with the coil of the solenoid operated valve 49 to close and condition the valve 49 for operation, the limit switch 52 (FIG. 7), when it opens as a bag leaves the checkweigher 10, causes a pair of relay contacts 60 and 61 in circuit with the motor windings A and B, respectively, to close and conditions the motor 57 for operation.

A limit switch 62 is in series with the relay contacts 58 and 60 in circuit with the motor winding A. A limit switch 63 is in series with the relay contacts 59 and 61 in circuit with the motor winding B. The limit switches 62 and 63 are considered "closed" hereinafter when they are in the positions shown in FIG. 7 Limit switches 62 and 63 are located physically in any convenient location in which they both are held closed by the segregation mechanism in its normal, nontilted position and in which limit switch 62 also is held closed when the segregation mechanism tilts into the "UNDER" reject position (FIG. 3) and in which limit switch 63 also is held closed when the segregation mechanism tilts into the "OVER" reject position (FIG. 4). When the limit switches 62 and 63 both are closed (no tilt), they condition the motor windings A and B, respectively, for energization. When the limit switch 62 opens (tilt into "OVER), it opens the circuit to the motor winding A and, by engagement with a terminal 64, completes a circuit through relay contact 60 and a lead 65 to the motor winding B. When the limit switch 63 opens (tilt into "UNDER"), it opens the circuit to the motor winding B and, by engagement with a terminal 66, completes a circuit through relay contact 61 and a lead 67 to the motor winding A.

In operation, closing of neither out-of-tolerance contact 12 or 12a leaves the reject mechanism in its horizontal position and the "O.K." bags are discharged from the discharge end of the nontilted segregation belt 27.

Closing of over-weight tolerance contact 12 latches the latch 53 which closes its relay contact 58 to complete a circuit through closed relay contact 60 (closes when the bag-operated limit switch 52 opens when a bag leaves the checkweigher 10) and closed limit switch 62 to the motor winding A. The motor 57 then runs from its center position in a direction to tilt the segregation mechanism into its position shown in FIG. 4. When the segregation mechanism tilts, limit switch 55 is closed to unlatch the latch 53 (relay contact 58 opens) and limit switch 62 is moved to engage the terminal 64. This breaks the circuit to the motor winding A and completes a circuit through closed relay contact 60 and the lead 65 to the motor winding B. The motor 57 then runs in the opposite direction until limit switch 62 returns to its FIG. 7 position when the segregation mechanism arrives at its nontilted, horizontal position. Relay contacts 60 and 61 reopen when the next bag closes the limit switch 52. This returns the motor control circuit 57 to its condition shown in FIG. 7 (no tilt).

Closing of under-weight tolerance contact 12a latches the latch 54 which closes its relay contact 59 to complete a circuit through closed relay contact 61 (closes when the bag-operated limit switch 52 opens when a bag leaves the checkweigher 10) and closed limit switch 63 to the motor winding B. The motor 57 then runs from its center position in a direction to tilt the segregation mechanism into its position shown in FIG. 3. When the segregation mechanism tilts, limit switch 56 is closed to unlatch the latch 54 (relay contact 59 opens) and limit switch 63 is moved to engage the terminal 66. This breaks the circuit to the motor winding B and completes a circuit through closed relay contact 61 and the lead 67 to the motor winding A. The motor 57 then runs in the opposite direction until limit switch 63 returns to its FIG. 7 position when the segregation mechanism arrives at its nontilted, horizontal position. Relay conatcts 60 and 61 reopen when the next bag closes the limit switch 52. This returns the motor control circuit 57 to its condition shown in FIG. 7 (no tilt).

Another feature resides in the versatility provided in the ability to tilt either to the right or left of the main stream flow to divert both over-weight and under-weight bags in the same direction (FIGS. 5 and 6—one-way tilt), and to tilt in two directions to divert over-weight bags in one direction and under-weight bags in the other direction (FIGS. 1–4 and 7—two-way tilt). This permits the tailoring of the segregation mechanism for the varying demands of various installations.

It is to be understood that the above description is illustrative of this invention and that various modifications thereof can be utilized without departing from its spirit and scope.

Having described the invention, I claim:

1. In a segregation device, in combination, an endless conveyor, drive means for driving the conveyor in a single direction, and means for rotatably mounting the conveyor and the drive means for movement as one about an axis extending generally in said direction.

2. In a segregation device, in combination, rockably mounted conveyor means, drive means for the conveyor means, and means for tilting both said means to at least one side of the normal conveying path of the conveyor means.

3. In a segregation device, in combination, conveyor means, drive means for the conveyor means, and means for rotatably mounting the conveyor means and the drive means for movement as one about an axis extending generally longitudinally of the conveyor means, whereby the conveyor means is tiltable from a normal conveying position to a reject position, said conveyor means and drive means being symmetrical on either side of said axis, whereby the conveyor means is self-balancing when it is in said normal position.

4. In a segregation device, in combination, a base, a shaft rotatably mounted on the base, a frame carried by the shaft, an endless conveyor belt movably mounted on the frame for main stream flow movement generally in the same direction as the axis of the shaft, drive means carried by the shaft for driving the conveyor belt, and means for tilting the frame about the axis of the shaft, whereby the conveyor belt is tiltable from a normal conveying position into a reject position to segregate articles from the main stream flow.

5. In a segregation device, in combination, a base, a shaft rotatably mounted on the base, a frame carried by the shaft, an endless conveyor belt movably mounted on the frame, means for tilting the frame about the axis of the shaft, and stop means for limiting said tilting, whereby the conveyor belt is tiltable from a normal conveying position into a reject position.

6. A checkweighing system comprising, in combination, a checkweigher, a first endless belt which serves both to convey articles in a first direction across the checkweigher and as a load platform for the checkweigher; a tiltably mounted second endless belt so juxtaposed to the first belt that when both belts are run to convey in said first direction the articles automatically transfer in main stream flow from the first to the second belt, both belts being of the same length and run at the same speed to synchronize the system, and means for tilting the second belt to separate articles from said main stream flow.

7. A checkweighing system comprising, in combination, a checkweigher including a first endless conveyor belt, and a segregation device including a second endless conveyor belt, the belts being so arrnged that articles to be checkweighed and segregated into groups depending upon their weight are carried in a rectilinear path across the checkweigher and transferred to the second belt in a continuance of the rectilinear path, and means for tilting the second belt from a normal position to at least one side of the rectilinear path to separate articles into at least one group of a weight class different from the weight class of the group of articles obtained by leaving the second belt in said normal position.

8. A checkweighing system comprising, in combination, a checkweigher including a first endless conveyor belt, and a segregation device including a second endless conveyor belt, the belts being arranged to carry articles to be checkweighed and segregated in main stream flow from a loading end of the first belt to a discharge end of the second belt, said belt ends being remotely located, and means for tilting the second belt to one side of said main stream flow.

9. A checkweighing system comprising, in combination, a checkweigher including a first endless conveyor belt, and a segregation device including a second endless conveyor belt mounted to tilt about an axis extending generally longitudinally of the second belt, the belts being arranged to carry articles from a loading end of the first belt to a discharge end of the second belt, and means for tilting the second belt about said axis.

10. A checkweighing system comprising, in combination, a checkweigher including a first endless conveyor belt, and a segregation device including a second endless conveyor belt mounted to tilt about an axis extending generally longitudinally of the second belt and drive means mounted to tilt together as one with the second belt for driving the second belt, the belts being arranged for the automatic transfer of articles from the first to the second belt, and means for tilting the second belt and the drive means about said axis.

11. A checkweighing system comprising, in combination, a checkweigher including a first endless conveyor belt, a segregation device including a second endless conveyor belt mounted to tilt about an axis extending generally longitudinally of the second conveyor belt, the belts being arranged for the automatic transfer of articles from the first to the second belt, being of the same length and being run at the same speed, and means for tilting the second conveyor belt about said axis.

12. A checkweighing system comprising, in combination, a checkweigher including a first endless conveyor belt and means for producing an electrical signal in accordance with the weight of an article upon the first belt, and a segregation device including a second endless conveyor belt mounted to tilt about an axis extending generally longitudinally of the second belt, the belts being arranged for the automatic transfer of the article from the first to the second belt, tilt means for tilting the second belt about said axis, and control means for controlling the tilt means in accordance with the electrical signal.

13. A checkweighing system comprising, in combination, a checkweigher including a first endless conveyor belt, and a segregation device including a second endless conveyor belt mounted to tilt about an axis extending generally longitudinally of the second belt, the belts being arranged for the automatic transfer of an article from the first to the second belt, tilt means for tilting the second belt from a home position into a fully tilted position about said axis, and interlock means for preventing operation of the tilt means to tilt the second belt out of said home position until the article has substantially completed said automatic transfer and for preventing operation of the tilt means to return the second belt to said home position until the second belt has been tilted into said fully tilted position.

14. A checkweighing system according to claim 8 having interlock means for preventing operation of the means for tilting to tilt the second belt to one side of said main stream flow until a checkweighed article to be segregated has been substantially removed from the checkweigher.

15. A checkweighing system according to claim 9 having interlock means for preventing operation of the means for tilting to return the second belt to its untilted position until the second belt has been fully tilted.

16. A checkweighing system comprising, in combination, a checkweigher including conveyor means, and a segregation device including an endless conveyor belt, the conveyor means and the conveyor belt being arranged to move articles to be checkweighed and segregated in main stream flow from a loading end of the conveyor means to a discharge end of the conveyor belt, and means for tilting the conveyor belt to one side of said main stream flow.

References Cited by the Examiner

UNITED STATES PATENTS

| | | | |
|---|---|---|---|
| 2,086,160 | 7/1937 | Gotthardt et al. | 193—36 |
| 2,308,729 | 1/1943 | Walter | 209—121 |
| 2,344,596 | 3/1944 | Carmina | 209—74 X |
| 2,732,067 | 1/1956 | Cunningham et al. | 209—121 |
| 2,900,091 | 8/1959 | Minter | 214—2.5 |
| 3,147,845 | 9/1964 | Harrison et al. | 209—125 X |

M. HENSON WOOD, JR., *Primary Examiner.*

A. N. KNOWLES, *Assistant Examiner.*